United States Patent [19]

Minnick et al.

[11] 3,798,607

[45] Mar. 19, 1974

[54] MAGNETIC BUBBLE COMPUTER

[75] Inventors: Robert C. Minnick, Houston, Tex.; Paul T. Bailey, Creve Coeur; Robert T. Sandfort, St. Charles, both of Mo.; Warren L. Semon, Dewitt, N.Y.

[73] Assignee: Monsanto Company, St. Louis, Mo.

[22] Filed: Dec. 1, 1972

[21] Appl. No.: 311,401

[52] U.S. Cl. .......................... 340/172.5, 340/174 TF

[51] Int. Cl. .......................... G06f 3/00, G11c 11/02

[58] Field of Search .................... 340/172.5, 174 TF; 307/88 LC, 88 TF

[56] References Cited

UNITED STATES PATENTS 3,541,522 11/1970 Bobeck et al. .................... 340/172.5

*Primary Examiner*—Raulfe B. Zache

*Attorney, Agent, or Firm*—Lane, Aitken, Dunner & Ziems

[57] ABSTRACT

In a general purpose computer system operating on a fetch-execute cycle, arithmetic, logic, storage and control functions are carried out by means of magnetic bubble circuits. A plurality of logic sub-systems called modules are interconnected by a closed unidirectional buss permitting intermodule transfer of data in the form of magnetic bubbles. The memory for the computer consists of a plurality of serial shift registers called mark-time lines each comprising a chain of recirculating loops. On signal, data can be advanced in series around the chain. Modules in one subset are specialized to perform various functions. The remaining modules constitute logic interfaces between corresponding mark-time lines and the special subset of modules. All instructions include designating an intermodule transfer or of initiating a search for a storage location in a mark-time line.

22 Claims, 14 Drawing Figures

MAGNETIC BUBBLE COMPUTER

BACKGROUND OF THE INVENTION

The invention relates generally to the field of magnetic bubble technology (MBT) and more particularly to logic arrangements for data processing utilizing the capabilities of single wall magnetic domain devices.

The continuing evolution of MBT has now reached the point where large scale application to various data processing tasks is practicable. Current interest in MBT is due primarily to the prospect of extremely high bit packing density, low power consumption and reliability for low cost mass memories.

Briefly, MBT involves the creation and propagation of single wall magnetic domains in specially prepared magnetic materials. The application of a static uniform magnetic bias field orthogonal to a sheet of magnetic material having suitable uniaxial anisotropy causes the normally random serpentine pattern of magnetic domains to shrink into short cylindrical configurations called bubbles whose common polarity is opposite that of the bias field. The bubbles repel each other and can be moved or propagated by a magnetic field in the plane of the sheet.

Many schemes now exist for propagating bubbles along predetermined channels. One propagation system includes permalloy circuit elements shaped like military service stripes or "chevrons" spaced end-to-end in a thin layer over a sheet of magnetic material. The magnetic drive field is continuously rotating in the plane of the sheet. This propagation field is termed "field-access" as distinguished from other systems employing loops of electrical conductors disposed on the sheet. The operation of chevron circuits is fully described in the existing literature on MBT.

The use of MBT in data processing stems from the fact that the bubbles can be propagated through their channels at a precisely determined rate so that uniform streams of bubbles are possible in which the presence or absence of a bubble indicates a binary "1" or "0" at a corresponding bit position within the stream. The use of MBT for performing logic operations is based on the fact that closely adjacent magnetic bubbles tend to repel each other. Thus, if alternate paths with varying degrees of preference are built into the bubble circuit, the direction which a bubble on one channel ultimately takes can be influenced by the presence or absence of a bubble on another nearby channel.

Besides the inherent capability of performing logic with magnetic domains, one other aspect of MBT has given impetus to logic developement. MBT was originally envisioned as a mass memory, but the most difficult problem has been encountered in readout. Optical devices utilizing the Faraday effect and magnetoresistive devices have been used, but are not entirely satisfactory. Therefore, it is important to minimize readout to the extent possible by incorporating logic in the memory so that the magnetic bubble bits representing information can be logically manipulated before readout is necessary, thus increasing the quality or informational content of each bit of readout.

It is believed that no general purpose computer systems based on MBT have ever been described before in the literature. However, a number of useful logic building blocks have been described. In particular, specific realizations for generating all of the output functions possible with three input — three output (3—3) "conservative" bubble logic gates are shown in the copending application Ser. No. 283,267, filed Aug. 24, 1972, by R. C. Minnick et al., entitled "Magnetic Bubble Logic Family", and in the paper entitled "Magnetic Bubble Logic", Minnick et al., *Wescon Proceedings*, Sept. 1972. These papers also introduced a symbology for representing the distinct functions of various classes of transfer fields between adjacent bubble tracks. That symbology is adopted by reference throughout the disclosure which follows. In addition, these papers discussed a methodology for constructing arbitrary logic functions using the 31 distinct classes of 3—3 circuits.

Reset-set and toggle-type flip-flops are shown in the following articles: "Resident-bubble Cellular Logic Using Magnetic Domains", Garey, *IEEE Transactions on Computers*, April 1972, page 392; and "Propagation of Cylindrical Magnetic Domains in Orthoferrities", Perneski, *IEEE Transactions on Magnetics*, September 1969, page 554. A special type of bubble logic decoder is shown in "A Self-contained Magnetic Bubble-Domain Memory Chip", *IEEE Transactions on Magnetics*, June 1972, page 214. A bubble domain memory array is also discussed in the Chang article. Another type of mass memory is shown in the article "Magnetic Bubbles", Bobeck et al., *Scientific American*, June 1971, page 78. At page 90 of the Bobeck article, a bubble mass memory is shown having a major loop and a plurality of recirculating minor loops connected in parallel to the major loop. Corresponding bits in all of the loops are transferred at the same time into the major loop. In the absence of a transfer command, data recirculates in the minor loops, but the loops are not arranged for serial inter-loop transfer. A similar device appears to be shown in U.S. Pat. No. 3,646,529 to Bobeck.

The following description is not restricted in application to any particular type of MBT device. The word "bubble" used throughout this application is intended to encompass any single-walled magnetic domain, defined as a domain having an outer boundary which closes on itself. The manner of bubble propagation is an important factor in the implementation and performance of the circuits described below. However, this disclosure is not limited of necessity to chevron circuit elements, nor even to field-accessed circuit elements, although it is recognized that it is a decided advantage to utilize individual circuit elements which pack very closely like chevrons. Since the logic capability of MBT is due primarily to bubble-bubble repulsion, in contrast to pure memory capabilities which rely on the presence and absence of bubbles, the disclosed circuits in which logic is performed in most instances involve schemes in which bubble propagation paths come close enough at some point that the bubbles in two or more paths exert a useful magnetic influence on each other.

SUMMARY OF THE INVENTION

The general purpose of the invention is to enable data processing by means of magnetic bubbles. Another object of the invention is to demonstrate the construction of a large scale, general purpose computer system in which all the functional requirements are implemented by means of magnetic bubble circuits.

The computer system disclosed herein includes a plurality of logical subsystems called "modules" interconnected by a closed, i.e., endless, one-way buss called the "daisy chain" which permits intermodule transfer in one direction of data represented by bubble streams composed of "bubble bits", i.e., presences or absences of bubbles. Each of the modules can be independently operated by means of a central control system located, in the preferred embodiment, within the closed daisy chain. The computer operates on a regular fetch-execute cycle.

The memory for the computer consists of a plurality of serial shift registers called "mark-time lines". Each mark-time line includes a plurality of closed loops serially interconnected by means of current-controlled interloop paths. In the absence of a shift signal, bubbles recirculate or "mark-time" in the closed loops. Each closed loop has the same length, and therefore at the end of one cycle the whole memory is in the same condition it was in following the previous cycle. On signal, information in the form of bubble bits advances synchronously from one closed loop to the next loop via an interloop path.

Some of the modules on the daisy chain are specialized to perform various arithmetic, logic and control functions. The remaining modules are called "line modules" and constitute logic interfaces between corresponding mark-time lines and the arithmetic portions of the computer. Each line module contains one word length of the mark-time line called the "datum register". In addition, there are two serial one word registers associated with each line module, the present address register and the search address register. Each mark-time line is started and stopped under the control of its line module.

The elements of the computer are arranged on a plurality of chips. For example, in the disclosed embodiment all of the modules on the daisy chain and the central control system are arranged on a single chip and the remaining portions of each mark-time line are arranged on individual chips. Interchip connections are made by means of electrical conductors which operate current-controlled generators on one chip in response to the electrical output of a bubble detector on another chip.

In the disclosed embodiment the work size is sixteen bits. A typical instruction word uses the leading five bits to indicate the address of a source module, the next three bits, termed the "control field", to control the source module, the next five bits to indicate the address of a destination module and the last three bits as the control field for the destination module. All instructions consist of designating an intermodule transfer or of initiating a search for a word location in a mark-time line.

A number of other important subsystems are presented including a bubble circuit realization for the fetch-execute control, a five-stage serial-to-parallel converter, a bubble tripler and a 32 output decoder for steering the control fields to the correct source and destination modules.

OVERVIEW OF THE COMPUTER SYSTEM

Figure 1:
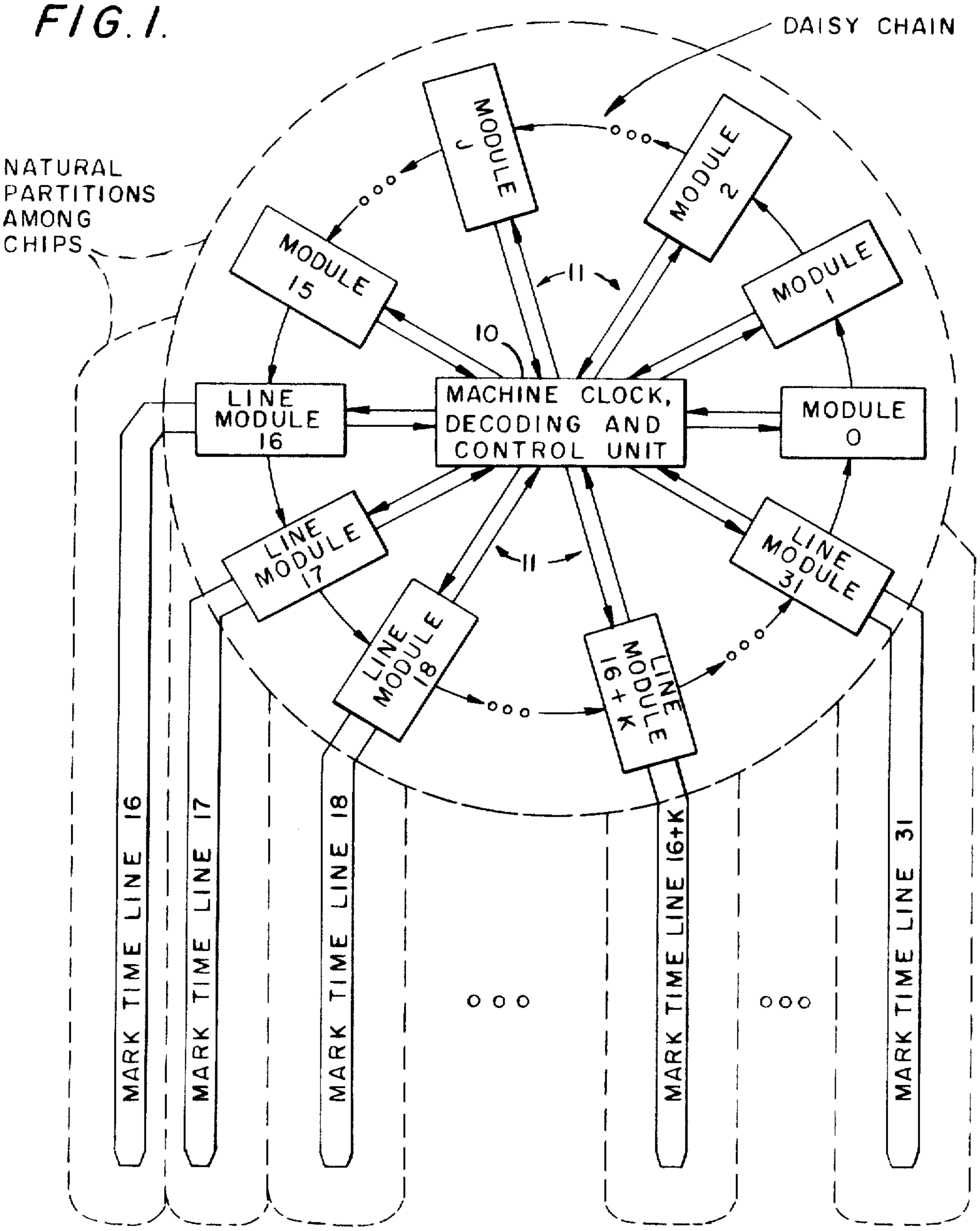
FIG. 1 is a block diagram of a bubble computer.

As shown in FIG. 1, there are 32 logical subsystems or modules in the computer. The modules are connected in series by means of a closed propagation path or daisy chain. It should be noted that the block diagram in FIG. 1 is also intended to convey the physical geometry of the system. The 32 modules communicate individually with a central machine clock, decoding, and control unit 10 via separate radiating bubble paths 11. The daisy chain and the paths 11 between the modules and control unit 10 may be made of any type of bubble porpagation circuit such as the well-known chevron elements.

Sixteen serially interconnected modules, modules 0–15, are specialized to perform various arithmetic logic and temporary storage functions. The other 16 modules, modules 16–31, serve as an interface for the memory system of the computer. Modules 16–31 are called line modules to distinguish them from the specialized modules 0–15.

The memory for the computer consists of 16 serial shift registers. These shift registers are designated mark-time lines 16–31. Each shift register holds 256 words of 16 bits each. Each of the 256 words of storage corresponds to a recirculating closed path circuit described in detail below. Each line module is associated with one of the mark-time lines. One word length of the 256 word storage mark-time line is included in the line module as the datum register. Each line module serves as a means of extracting data from the associated mark-time line and placing it on the daisy chain or of taking information off of the daisy chain for storage in the associated mark-time line.

The dashed lines in FIG. 1 illustrate an allotment of the functional sections of the computer to various magnetic bubble chips, for example, of the well-known garnet composition. In this design the 32 modules on the daisy chain including the datum registers of the mark-time lines and the central control unit 10 are arranged on a single central chip. The major storage portion of each mark-time line, that is that portion exclusive of its datum register, occupies a separate adjacent chip. Because magnetic bubbles cannot be transferred as bubbles from one chip to another chip, the chip boundaries form natural partitions. Where a bubble circuit path appears to cross a chip boundary in the block diagram of FIG. 1, an electrical transfer circuit is used. A bubble is detected at the boundary of one chip and converted into an electrical signal which causes a corresponding bubble to be regenerated instantaneously at the boundary of another chip.

Figure 2:
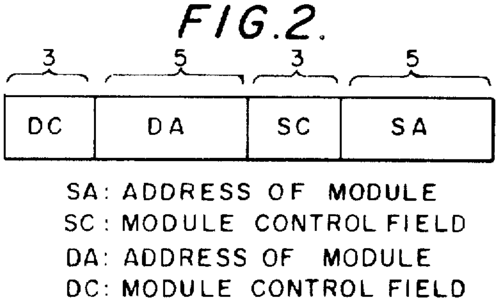
FIG. 2 is a schematic drawing and legend representing the format of an instruction word.

The 16 bit instruction format is shown in FIG. 2. The computer operates on a conventional fetch-execute cycle in which all instructions consist of designating a transfer from one of the 32 modules to another module, or of initiating a search for a word location in a mark-time line. The source and destination modules each receive a three bit code or control field which specifies the function of the module during transfer. Accordingly, in FIG. 2, the first five leading bits SA of the instruction represent the address of the source module. Five bits are required to specify 32 modules. The next three bits SC of the instruction word represent the control field for the source module. Similarly, the next five bits DA designate the address of destination module, and the last three bits DC are the control field for the destination module. The specific module actions during transfer may simply be to recirculate data through the module as if it were a simple conduit or if it is the source module, to read information out onto the daisy chain or if it is the destination module to write information taken from the daisy chain into a register within the module. Other module actions are described in detail below.

The type of each module in the system of FIG. 1 is listed in Table I below:

TABLE I

| Module | Name |
|---|---|
| MO | Line Number Register |
| M1 | Index Register Number 1 |
| M2 | Index Register Number 2 |
| M3 | Index Register Number 3 |
| M4 | Instruction Register |
| M5 | Accumulator Register Number 1 |
| M6 | Accumulator Register Number 2 |
| M7 | Accumulator Register Number 3 |
| M8 | Accumulator Register Number 4 |
| M9 | Shift Register Number 1 |
| M10 | Shift Register Number 2 |
| M11 | Immediate Register |
| M12 | General Register Number 1 |
| M13 | General Register Number 2 |
| M14 | General Register Number 3 |
| M15 | General Register Number 4 |
| $M_{16}$ to $M_{31}$ | Line Modules |

Instructions are stored in the mark-time lines, the computer's memory. Module 0, the line number register, designates the line module from which an instruction is to be obtained. Module 0 ordinarily designates the same line module over a number of consecutive fetch-execute cycles to utilize a number of serially stored instructions in the mark-time line associated therewith. Consecutive instructions are automatically presented by the line module for the associated mark-time line. During the fetch phase, module 0 sends a special 16 bit word to the control unit 10 which causes a designated line module to read out an instruction around the daisy chain, counterclockwise as shown in FIG. 1, to module 4, which is always the module for which the instruction is destined by module 0. Thus, module 0 holds a pointer to the line module and associated mark-time line from which instructions presently are being obtained, while the fetched instruction is buffered in module 4, the instruction register. When the instruction is entered, module 4 sends a signal to the control unit 10 ending the fetch phase and initiating the execute phase. Under the control of the instruction stored in module 4, the control unit 10 causes the two control fields in the instruction to be routed to the designated source and destination modules. When the destination module signals that the daisy chain is clear, the fetch phase is re-entered with module 0 again indicating the source of the next instruction to be buffered in module 4.

Modules 1, 2 and 3 are index registers which precede module 4 on the daisy chain and can be used to index or increment addresses in instructions as they pass around the daisy chain to module 4, the instruction register. In this manner, the same instruction can be repeated on data stored in different locations. Modules 5–8 are four identical arithmetic registers: each performs additions and subtractions. Higher arithmetic operations are performed by combinations of addition and subtraction using modules 5–8 in successive fetch-execute cycles.

To facilitate subtraction, the number system used in the computer is two's complement with the sign bit inverted. This number system is particularly suitable for asynchronous operation because all valid words have at least one binary "1".

It should be carefully noted that the only 16 bit words which pass radially on paths 11 from a module to the control unit 10 are the instruction address word from module 0 during the fetch phase and the instruction itself from module 4 during the execute phase. The only other information which passes from a module to the control unit 10 are signals indicating that a destination module has finished its directed operation or a mark-time line and line module are engaged in a search. All intermodule transfer of words is therefore via the daisy chain.

Modules 9 and 10 are used together for the purpose of shifting bit positions of binary numbers. Two modules are used for shifting because of the limited number of bits in the control field. Module 11, the immediate register, represents a special read-only-memory from which binary constants can be read when needed in calculations.

The remaining special purpose modules 12–15 are simple buffer registers which store intermediate or temporary results for use in subsequent operations. One of these registers may be used to provide an output from the computer.

A program of instructions may be fed directly into the major storage portion of the mark-time line associated with the line module to which module 0 points as the source during the fetch phase of the fetch-execute cycle.

The number of index registers, accumulator registers and general registers is somewhat arbitrarily determined to fulfill the quota of 32 modules. The function and relative number of these registers can be altered to meet specific requirements.

DETAILED DISCUSSION OF THE COMPUTER'S SUBSYSTEMS

Figure 3:
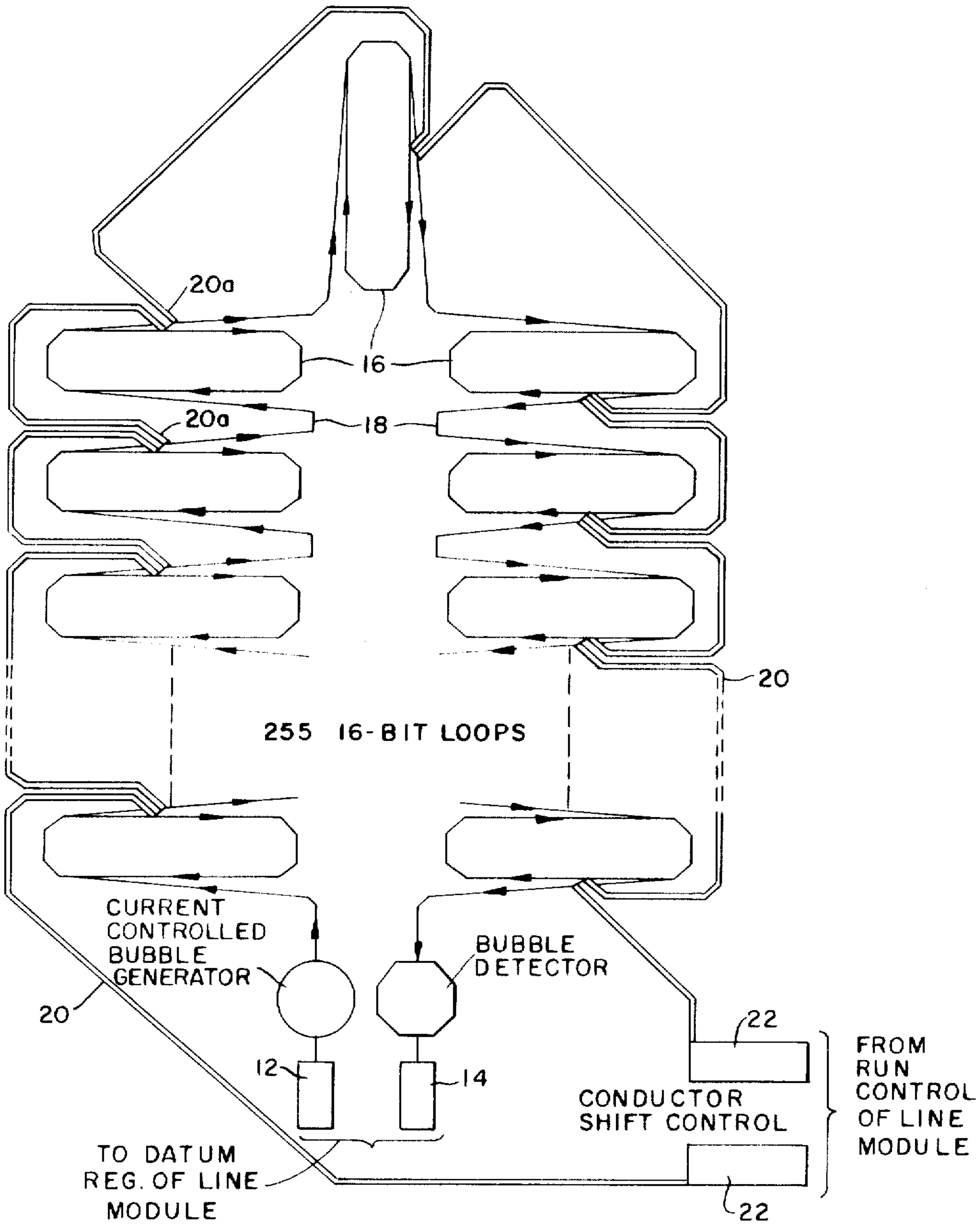
FIG. 3 is a schematic and block diagram of a mark-time line.

A schematic diagram of the major storage portion of one of the mark-time lines is shown in FIG. 3. The first thing to note about the illustration is that both electrical current conductors and magnetic bubble tracks are present. To avoid confusion, bubble tracks appear as narrow lines with arrows. The "input" to the major storage portion of the mark-time line is a current controlled bubble generator having a bonding pad 12 which would be formed on the surface of the chip containing a mark-time line. Likewise, the "output" consists of a bubble detector connected to another bonding pad 14. The pads 12 and 14 are not to be considered the inputs and outputs of the entire shift register. One word length of storage of the mark-time line is contained in the datum register of the line module associated with the mark-time line. All of the line modules on the daisy chain being on a central separate chip from each of the mark-time lines, the bonding pads 12 and 14 form instantaneous electrical interconnections between the mark-time line chip and the associated line module on the central chip. The central chip has bubble generators and detectors corresponding to each bubble detector and generator in each mark-time line chip to provide for bubble transfer between the major storage portions of the mark-time lines and the corresponding datum registers.

The bubble path in the mark-time line consists of 255 sixteen-bit recirculating loops 16 serially interconnected by means of current-controlled bubble transfer paths 18.

A continuous electrical conductor 20 is threaded through the interconnected loops 16 such that a conductor loop end 20*a* is formed at the input end of each transfer path 18 from a "preceding" loop 16. The bubble propagation direction as viewed in FIG. 3 is clockwise. The ends of the electrical conductor are connected to bonding pads 22 which are electrically connected to a special electrical "RUN" output of the associated line module. On signal, current flows through the conductor 20, and its loop ends 20*a* act like tiny attracting magnets to pull the bubbles off the preceding loop onto the transfer path. Bubbles will be advanced from one loop 16 to the next loop 16 as long as the electrical conductor 20 is energized. As soon as the conductor current stops, the register enters the mark-time mode in which data recirculates in the loops 16 without advancing from one loop to the next.

The length of the storage loops 16 is equal to the word length, W, plus any unused storage bits, $K_1$. Where the word length is 16, the number of unused storage bits may be equal to one bit and the transfer path length, $K_2$, should be 15 bits long. The 50 percent storage efficiency of this arrangement is calculated from the expression, $W/(W + K_1 + K_2)$.

Data may be fed directly into any mark-time line simply by controlling the bubble generator to produce bubbles in accordance with the data while applying current to the conductor 20. In this manner a program of instructions may be fed into the mark-time line associated with the line module to which the module 0 points as the source module during the fetch phase of the fetch execute cycle.

Figure 4:
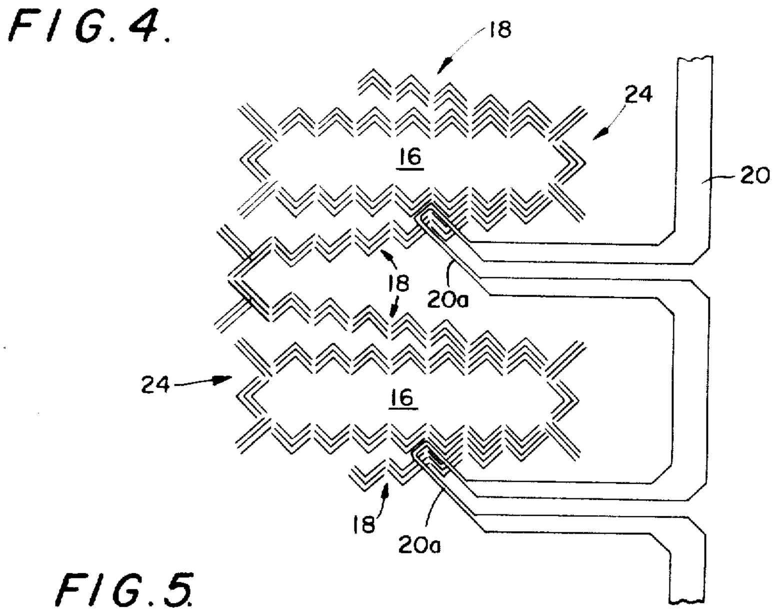
FIG. 4 is a schematic drawing illustrating a portion of a bubble circuit realization for the mark-time line of FIG. 3.

FIG. 4 shows a specific bubble circuit realization for a representative portion of the mark-time line using chevron circuit elements. The particular section of the mark-time line depicted in FIG. 4 would correspond to adjacent loops 16 on the right-hand side of the mark-time line as viewed in FIG. 3. The "ears" 24 at the end of each circuit loop represent turning circuits. The input to a transfer path 18 at the conductor loop end 20*a* branches off from a recirculating loop 16. The principle of the weak S curve, as explained in the above mentioned Wescon paper and co-pending application, is used for the transfer path. In the absence of outside influence, a bubble on the loop 16 will take the preferred path and remain on the loop 16 rather than taking the transfer path 18. Instead of bubble-bubble repulsion, the attracting magnetic field formed by the loop conductor end 20*a* is used to influence the bubble to take the transfer path 18. The transfer path 18 must be long enough to provide in effect a delay of almost one word so that the word in the subsequent loop 16 has a chance to exit.

Figure 5:
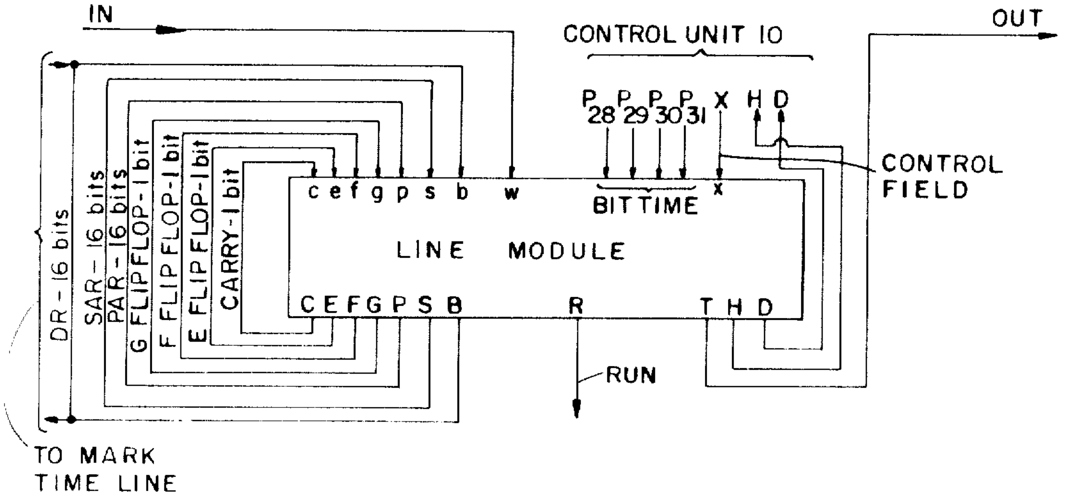
FIG. 5 is a block diagram of a line module of FIG. 1.

All of the line modules, modules 16–31, are identical. The functional inputs and outputs of the line module are shown in FIG. 5. The 16-bit word of the mark-time line contained in the line module is called the datum register, DR. In addition, there are two serial one-word registers associated with each line module, the present address register (PAR) and the search address register (SAR). The present address register contains the address within the mark-time line of the word currently in the datum register. Each mark-time line is started and stopped under the control of its line module, and similarly the incrementing of the present address register is controlled in order to keep track of the memory address. The number in the present address register represents the address of the word currently in the datum register. Three flip-flops designated, E, F, and G buffer the three bit sequential control field. The timing of the entire system is arranged in 32 bit segments. The control field of three sequential bits is designated as those bits which arrive on the bubble track $x$ at bit times $P_{29}$, $P_{30}$, and $P_{31}$ respectively. The bit which arrives at bit time $P_{29}$ is stored in the E flip-flop, the bit which arrives at bit time $P_{30}$ is stored in the F flip-flop and likewise, the bit which arrives at bit time $P_{31}$ is stored in the G flip-flop. Like the datum, search address and present address registers indicated in FIG. 5, the loops on which the legends E, F and G flip-flops appear represent the storage loops of bubble flip-flops. The logic circuits of the flip-flops are in the line module. The lines designated "IN" (w) and "OUT" (T) represent the connections of the line module to the daisy chain (FIG. 1). The in and out lines are actually a part of the daisy chain. Bubble line D from the line module to control unit 10 signals the control system that the line module has received a word destined for it on the daisy chain. The D signal indicates that the daisy chain is clear and the control system may proceed with the next operation. However, if a search of a mark-time line is underway, an H signal is also made true to inhibit any further control fields destined for the associated line module. Even though the line module is engaged in a search and cannot carry out other operations, fetch-execute cycles may continue in other modules while the search is underway. The "RUN" output of the line module causes current to be applied to the electrical conductor or shift control of the associated mark-time line so as to advance data around the serial shift registers of the mark-time line. The following tables II and III indicate the actions which can be specified by the control field.

TABLE II

| Control Code | | | OUTPUT | PAR | SAR | DR |
|---|---|---|---|---|---|---|
| 0 | 0 | 0 | IN → OUT | Recirculate | Recirculate | Recirculate |
| 0 | 0 | 1 | 0 → OUT | Recirculate | Write | Recirculate |
| 0 | 1 | 0 | DR → OUT | Recirculate | Match PAR | Read |
| 0 | 1 | 1 | SAR → OUT | Recirculate | Read | Recirculate |
| 1 | 0 | 0 | 0 → OUT | Write | Recirculate | Recirculate |
| 1 | 0 | 1 | 0 → OUT | Recirculate | Recirculate | Write |
| 1 | 1 | 0 | PAR → OUT | Read | Recirculate | Recirculate |
| 1 | 1 | 1 | DR → OUT | Count | Count | Recirculate |

TABLE III $E = xP_{29} + e(cP_{28})'$
$F = xP_{30} + f(cP_{28})'$
$G = xP_{31} + g(cP_{28})'$
$T = e'\, f'\, g'\, w + e'\, f\, g\, s + c\, f\, g'\, p + f\,(e \oplus g')\, b$
$P = p\,[e' + (f \oplus g)] + f'\, g'\, w + e\, f\, g\,[p \oplus c \oplus x]$
$S = s\,[f'\, g' + (e \oplus f \oplus g)'] + e'\, f'\, w + e\, f\, g\,[p \oplus c \oplus x]$
$C = [e\, f\, g\, \mathrm{Maj}\,(p, c, x) + f'\,(e \oplus g)\,(w + c) + e\, f'\, g\, c\,(p \oplus s)]\, P_{28}'$
$R = f\,(e \oplus g')$
$D = [f + c\,(c + G)]\, P_{28}$
$H = e + f + g$
$B = (e' + f = G')\, b + e\, f'\, g\, w$ In table II the eight possible control fields are indicated as rows of three bits each. The operations designated by a given control field are listed on the same row. The control codes or logic equations for the operations designated in table II are given in table III in standard Boolean terminology. A primed variable indicates inversion or "not true", and a circled plus sign means "exclusive or". Each formula in table III indicates when a bubble is to be provided by the line module at each of the outputs C, E, F, G, P, S, B, R, T, H, and D in accordance with the presence or absence of bubbles at the inputs. As pointed out above, a current is applied to conductor 20 in response to a bubble produced at the R output.

The simplest operation occurs when the line module acts as a conduit or as a part of the daisy chain. This action, or inaction is designated by the absence of bubbles on the $x$ line from the control unit 10 at the bit periods $P_{29}$, $P_{30}$, and $P_{31}$. This corresponds to the row coded "000" in table II. As shown in table II, the output of the line module (T) is the input (w) to the line module. The datum, search address and present address registers merely recirculate or mark-time. In table III the portions of the logic equation for T corresponding to the control code 000 is indicated as $e'\, f'\, g'\, w$.

The control code 000 indicates the conduit operation when this control code is received by way of the modules 0–31. This is the same as saying: if a module does not receive a control code it acts as a conduit.

The letters $e, f$ and $g$ indicate the values of the control code on line $x$ as stored in the flip-flops E, F and G. All the flip-flops are reset at bit time $P_{28}$. Thus, the expression for the input to the storage loop of the flip-flop E, for example, is given as $E = xP_{29} + e\,(c\,P_{28})'$, where the expression $xP_{29}$ corresponds to "set" or the presence of a bubble at bit time $P_{29}$, and the expression $e\,(cP_{28})'$ indicates that the flip-flop is reset to "0" at time $P_{28}$. The one bit carry line (C) is used to simplify the logic equation. The expressions for the other flip-flops F and G are similar except that the set function corresponds to the presence of control bubbles (x) at subsequent bit times $P_{30}$ and $P_{31}$.

Another operation for the line module is when it is instructed as a source module to read out onto the daisy chain whatever is in its datum register. This operation is designated by the control code "111" identifying the bottom row. The present address and search address registers increment their addresses and the datum register recirculates so as to read out its contents. In addition, the mark-time line is advanced by the RUN signal. In table III the portion of the logic equation for the output T which corresponds to reading out the data register is the expression $f\,(e \oplus g')\, b$.

The search operation is designated by consecutive control codes 001 and 010, in two sequential instructions. Under the control of the initial code 001 the address on the mark-time line of the desired instruction or data is written into the search address register by designating the line module as the destination for the search address which comes over the daisy chain. in this operation, there is no output from the line module, and the datum and present address registers are merely recirculated.

In order to initiate the search on the mark-time line for the data designated by the search address in the search address register, the control unit 10 forwards the code "010" to the line module which turns on the run signal causing data to advance along the mark-time line through the datum register. When the present address register matches the search address register the contents of the datum register are read out onto the daisy chain as indicated by the expression $f\,(e \oplus g')\, b$ for the output T in table III.

Code 011 designates the operation in which the contents of the search address register are read out onto the daisy chain. The other registers are recirculated. Code 100 designates the operation in which information on the daisy chain can be written into the present address register. These codes permit the search address register to be used as an auxiliary register. Code 101 designates the operation of writing information from the daisy chain into the mark-time line via the datum register. This important operation (101) serves to load data into the mark-time line. Code 110 allows the contents of the present address register to be read out onto the daisy chain.

Figure 6:
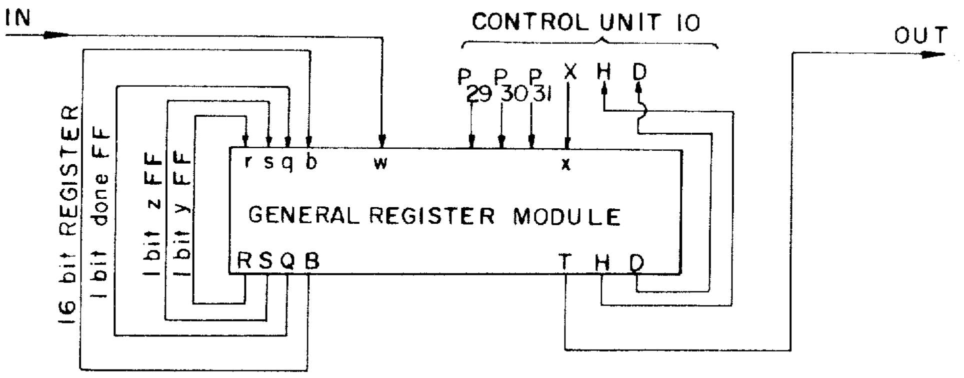
FIG. 6 is a block diagram of a general register module of FIG. 1.

One of the general register modules, modules 12, 13, 14 and 15 is illustrated in FIG. 6. The input line (w) and output lines (T) connect the module to the daisy chain (FIG. 1). The general register module receives control fields at appropriate bit times from the control unit 10. When the general register module is indicated as the destination or a word on the daisy chain, the signal D is sent from the general register module to the control unit after the word has been received indicating that the daisy chain is free. The H signal is not used in this module (or in any of the modules 0–15) because there are no operations which this module can perform simultaneously with fetch-execute cycles for other modules. The storage lines in the general register module comprise a 16-bit shift register into which data can be written and from which data can be read out onto the daisy chain. The general register module uses two control bit flip-flops, Y and Z, and a one bit "done" flip-flop, corresponding roughly to the carry line C of the line module described above. The following tables IV and V indicate the control codes and logic equations for the general register module.

TABLE IV

| Control Code | | | OUTPUT | REGISTER |
|---|---|---|---|---|
| 0 | 0 | 0 | IN → OUT | Recirculate |
| 0 | 0 | 1 | IN → OUT | Erase |
| 0 | 1 | 0 | 0 → OUT | Write |
| 0 | 1 | 1 | REGISTER → OUT | Recirculate (Read) |

TABLE V $R = xP_{30} + r(qP_{28})'$ $S = xP_{31} + s(qP_{28})'$ $Q = (w + q)\ P_{28}'$ $B = (r \oplus s')\ b + r\ s'\ w$ $T = r'\ w + r\ s\ b$ $D = (qr + r's)\ P_{28}$ $H = 0$ Only two of the three control bits are needed for the general register module as shown in Table IV, because four operations are sufficient for the desired actions. The operation of this module is specified by the equations in table V.

Figure 7:
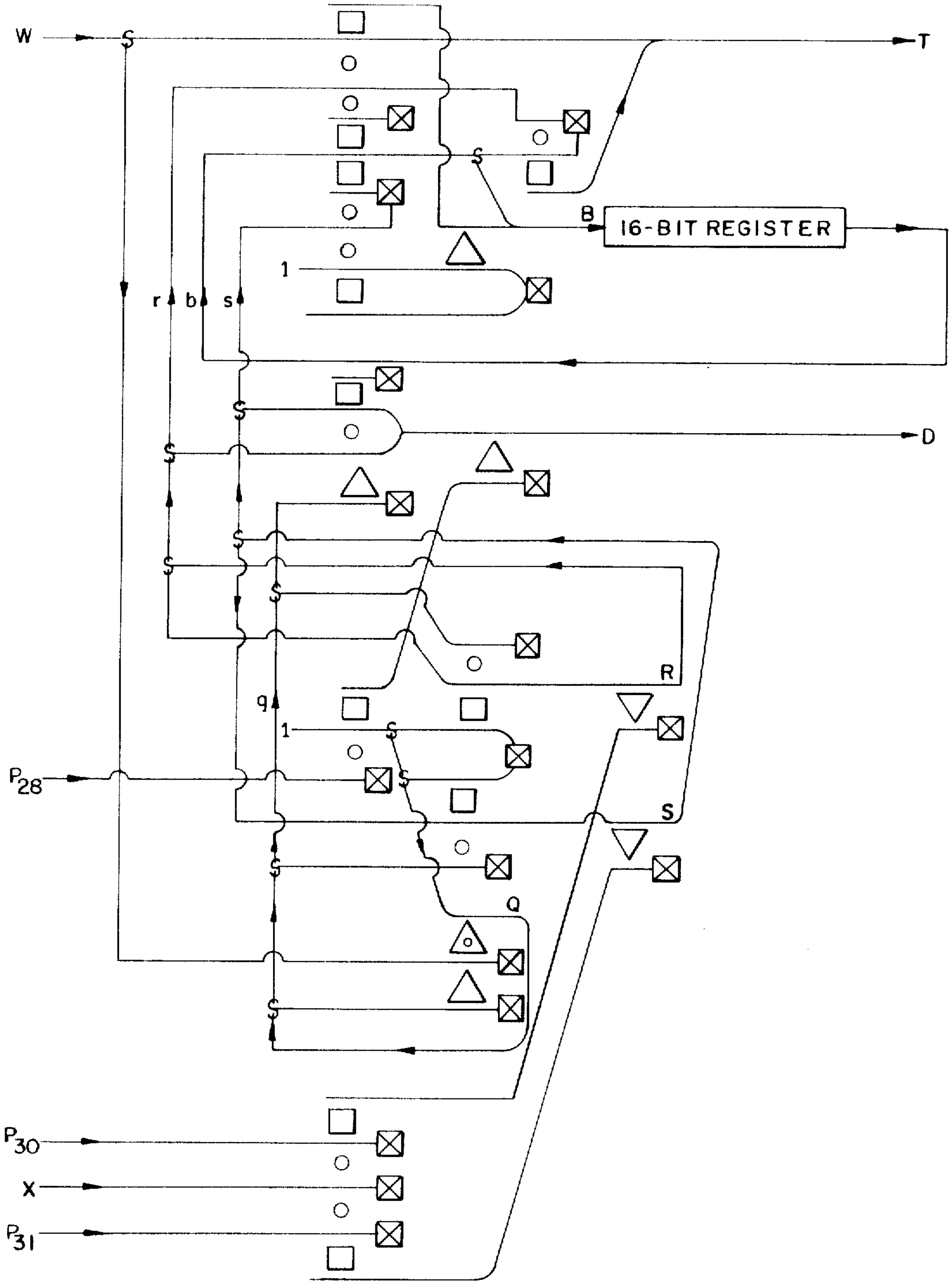
FIG. 7 is a schematic diagram of a bubble logic circuit realization for the general register module of FIG. 6.

A bubble circuit realization for the general register module is given in FIG. 7. The symbology used in this circuit is identical to that presented in the Wescon paper and co-pending application referred to above. This circuit implements the logic relationships in table V.

Figure 8:
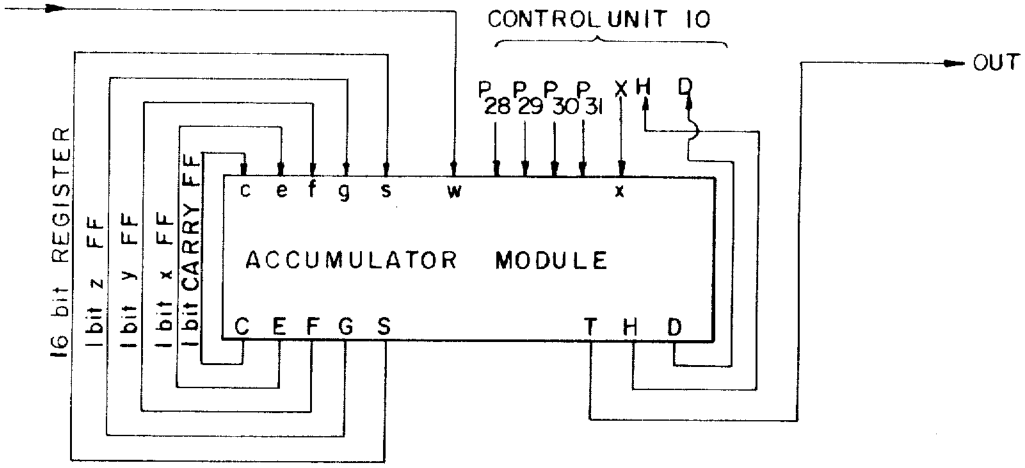
FIG. 8 is a block diagram of an accumulator register module of FIG. 1.

FIG. 8 shows one of the accumulator modules, modules 5–8. The arrangement of this module is similar to that of the line module shown in FIG. 5 except that only one 16-bit register is used instead of the three 16-bit registers for the line module. The control codes and logic equations are given in the following tables VI and VII.

TABLE VI

| Control Code | | | OUTPUT | REGISTER | OPERATION |
|---|---|---|---|---|---|
| 0 | 0 | 0 | IN → OUT | Recirculate | IDLE |
| 0 | 0 | 1 | 0 → OUT | Erase | ERASE |
| 0 | 1 | 0 | 0 → OUT | Write Input | WRITE |
| 0 | 1 | 1 | 0 → OUT | Negative Write | NEG. WRITE |
| 1 | 0 | 0 | S → OUT | Recirculate | READ |
| 1 | 0 | 1 | −S → OUT | Recirculate | NEG. READ |
| 1 | 1 | 0 | 0 → OUT | Add Input | ADD |
| 1 | 1 | 1 | 0 → OUT | Subtract Input | SUBTRACT |

TABLE VII $E = xP_{29} + e(cP_{28})'$ $F = xP_{30} + f(cP_{28})'$ $G = xP_{31} + g(cP_{28})'$ $T = e'\ f'\ g'\ w + ef'\ g'\ s + ef'\ g\ (s' \oplus x)$ $S = f'\ s\ (e + g') + e'\ fg'\ w + e'\ fg\ (w' \oplus y) + efg'\ (s \oplus w \oplus c \oplus P_{28}) + efg\ (s \oplus w' \oplus c \oplus x_{31} \oplus P_{28})$ $C = [efg'\ \mathrm{Maj}(s, w, c) + efg\ \mathrm{Maj}\ (s, w', c, x_{31}) + f'\ (e + g') + e'\ f\ (w + c)]\ P'_{28}$ $D = P_{28}c$ $H = 0$ The control codes "000", "001", "010" and "100" indicate operations indentical to those shown in table IV for the general register module. The operation designated by the control code "011", termed "negative write", specifies that the incoming data off the daisy chain is to be written into the register in two's complement form for use in a subsequent subtraction operation. Similarly the control code "101" causes the contents of the sicteen-bit register to be read out onto the daisy chain in two's complement form. The last two control codes "110 " and "111" cause the data from the daisy chain to be added to or subtracted from, respectively, the data stored in the 16-bit register of the accumulator module.

Figure 9:
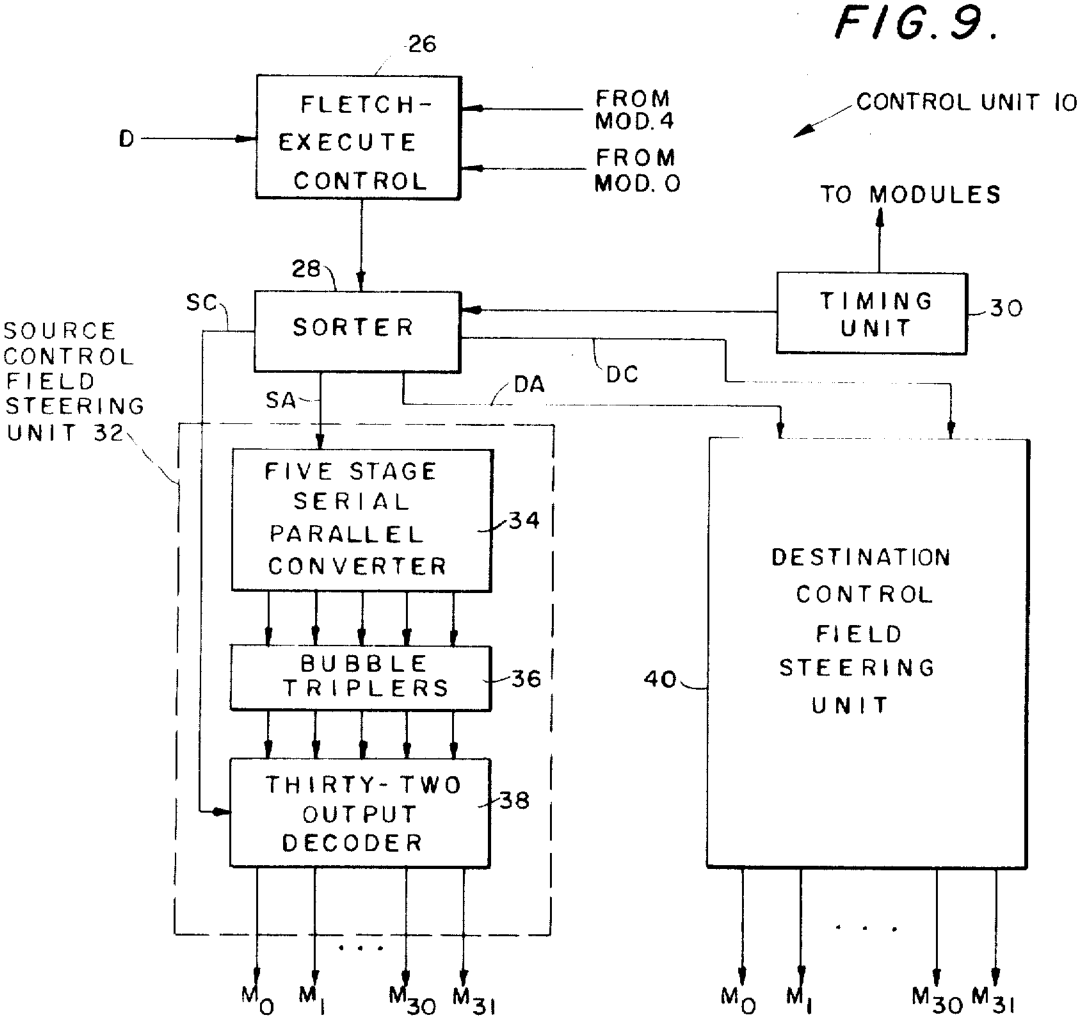
FIG. 9 is a block diagram representing the control unit of FIG. 1 in more detail.

As shown in FIG. 9, the central decoding and control unit 10 includes a fetch-execute control circuit 26 which alternately directs the contents of the modules 0 and 4 to the remaining decoding circuitry of the control unit. The D signal from a destination module which is finished receiving a word from the daisy interchanges the input of module 0 and 4 to the decoding circuitry. During the fetch phase, the address of the line module from which the instruction is to be fetched is obtained from module 0. Module 0 always indicates module 4, the instruction register, as the destination for the fetched instruction. The 16-bit word from the fetch execute control 26 is passed to a sorting circuit 28 controlled by a timing unit 30. The sorting circuit 28 causes the five sequential address bits for the source module, SA, to be passed through a source control field steering unit 32 containing in series a five-stage serial-to-parallel converter having five parallel outputs to five corresponding bubble triplers 36, necessary because the control field consists of three bits, and finally a 32 output decoder 38. The output decoder 38 also receives the source control field, SC, which is stripped off by the sorter 28. The decoder 38 causes the source control field to be routed to the addressed module.

Another decoding system called the destination control field steering unit 40 is identical in structure and operation to the source control field steering unit 32. The unit 40 causes the destination control field, DC, to be routed to the addressed module. In the fetch phase, a word from module 0 indicating the place where the instruction is stored always indicates module 4 as the destination and the control field or command for module 4 is always "write" the instruction into the buffer register.

The timing unit 30 in the central control unit 10 may simply comprise a plurality of closed loop bubble track shift registers with one bubble recirculating in each at different relative positions, and each closed loop would be equipped with a splitter to produce an output $P_i$, where $i$ is one of the bit times 0–32.

The sorter 28 comprises a plurality of gates operated by the timing unit 30 which causes the output of the fetch-execute control 26 to be routed to the converter 34 for the first five bit times, to the decoder 38 for the next three bit times. The last eight bits are routed in a similar manner to the corresponding components of the destination control field steering unit 40.

Figure 10:
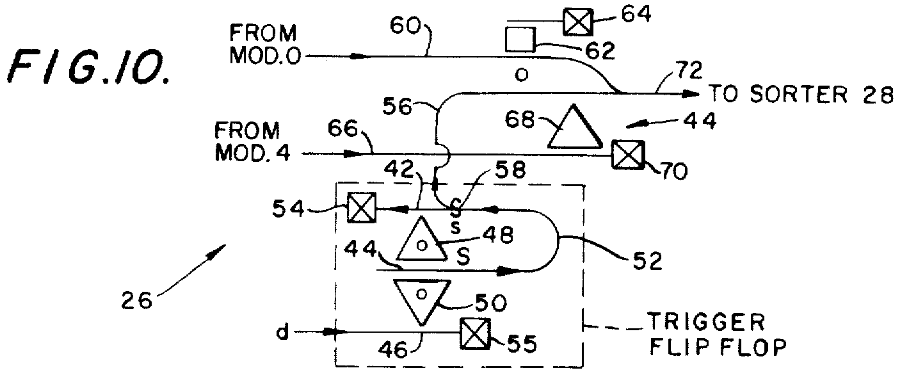
FIG. 10 is a schematic drawing illustrating a bubble logic circuit realization for the fetch-execute control of FIG. 9.

The bubble circuit realization for the fetch-execute control circuit 26 is shown in FIG. 10. The "d" input represents the daisy chain clear signal (d) from a module when either the fetch or execute phase has been completed. The control circuit of FIG. 10 includes a trigger flip-flop based on a "convervative" bubble logic circuit identified in the Wescon paper as a class 9 circuit. This circuit has a top track 42, a middle track 44 and a bottom track 46. Symmetrical transfer fields 48 and 50 are located between tracks 42 and 44 and tracks 44 and 46, respectively. Because of the transfer fields 48 and 50, a bubble on either the top or bottom track 42, 46 will be drawn to the middle track 44 in the absence of simultaneous bubbles on the other tracks. A bubble entering the middle track will remain on that track. A bubble on the top or bottom track 42, 46 will remain on that track is there is a bubble on another track. In FIG. 10, the $d$ line is the bottom track 46, and the middle track 44 is looped around through a one bit delay line 52 to the top track 42 leading to a bubble annihilator 54. The output of the flip-flop is split off by a bubble splitter 58 as a duplicate bubble on an output track 56 from the one bit delay storage loop 52. If the flip-flop is in the "reset" state with no bubble in the storage loop 52, a "d" bubble is transferred via the field 50 to the middle track 44, around the delay loop 52 and back to the middle track 44 through the field 48. The single bubble recirculates around the storage loop 52 between the top and middle tracks, each time producing an output bubble on track 56 by virtue of the splitter 58, and the flip-flop is thus in the "set" state. In the set state, a "d" bubble on track 46 will arrive when the recirculating bubble is passing in the opposite direction on the top track 42. These bubbles will be sufficiently repelled to avoid taking the preferred route through the transfer fields 48 and 50. Thus, the bubbles will remain on the top and bottom tracks and be destroyed by annihilators 54 and 55, thus ending the set state. The flip-flop will remain in the reset state, with no output bubbles, until the arrival of another "d" signal.

The contents of module 0 arrive on a track 60 which passes between the flip-flop output track 56 and a transfer field 62. Simultaneous bubbles on tracks 56 and 60 result in the bubble on track 60 being repelled through the field 62 and destroyed by an annihilator 64. The contents of module 4 arrive on a track 66 separated from the flip-flop output track 56 by a transfer field 68 downstream of the field 62. In the absence of a bubble on the module 4 track 66, the flip-flop output bubble on track 56 is drawn through the field 68 and destroyed by an annihilator 70. Downstream from field 68, the module 0 track 60 merges with the flip-flop output track 56 to form the output 72 of the fetch-execute control 26.

In operation, when the flip-flop is set, bubble bits from module 4 are replicated on the fetch-execute output line 72 and bubble bits from module 0 are annihilated. When the flip-flop is reset, by the "d" signal, the absence of bubbles on track 56 allows the module 0 bubble bits to reach the output line 72. Thus, the circuit of FIG. 10 automatically interchanges the streams from module 0 and module 4 under the control of the "d" signal.

Figure 11:
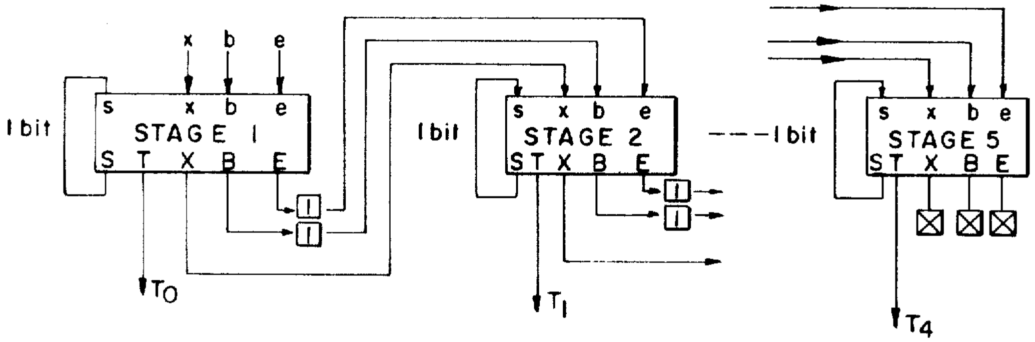
FIG. 11 is a block diagram illustrating the five-stage serial-to-parallel to converter of FIG. 9 in more detail.
Figure 12:
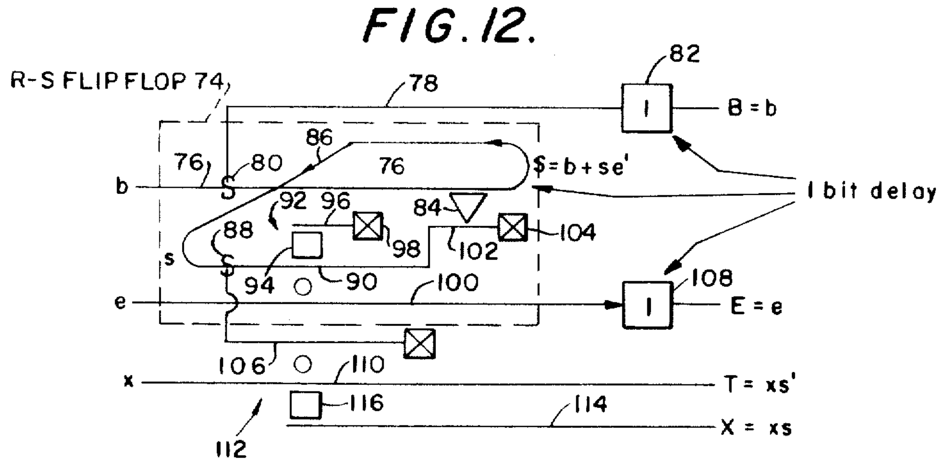
FIG. 12 is a schematic drawing illustrating a bubble logic circuit realization for one stage of the converter of FIG. 11.

FIG. 11 illustrates the serial-to-parallel converter in more detail. The sequential bubble input *x* to the first stage of the converter is the five bit serial output from the fetch-execute control via the sorter 28 representing an address designating a selected module. The structure and operation of the converter 34 is illustrated in a bubble realization for one stage in FIG. 12. The other stages are identical. The heart of each stage is a reset-set flip-flop 74. The flip-flop 74 includes a set input track 76 for receiving a set bubble *b* is reproduced on an output track 78 by a splitter 80. The output track 78 forms the input *b* to the next stage via a one bit delay 82. The original *b* input track downstream of the splitter 80 forms the preferred track for a transfer field 84. Downstream of the field 84 the track 76 proceeds around a storage loop 86 via a flip-flop output splitter 88 to form the middle track 90 of a 3—3 logic circuit 92 identified as a class 21 circuit in the Wescon paper. The circuit 92 includes a weak transfer field 94 between the middle track 90 and an upper track 96 with an annihilator 98. Another input channel for *e* or reset bubbles is provided by track 100 which forms the bottom track of the circuit 92. The bottom track is close enough (as symbolized by the circle) so that a bubble on the middle track 90 will be "pushed" through the field 94 by the presence of a simultaneous bubble on the bottom track 100 and annihilated. The middle track 90 becomes the bottom track 102 for the field 84. The bottom track 102 has an annihilator 104 downstream of the field 84. A *b* or set bubble on track 76 will recirculate via the storage loop 86 and the transfer field 84, each time causing an output bubble to be split off on an output track 106 by the splitter 88. An *e* bubble on the reset track 100 stops the recirculation. The *e* bubble is also fed to an output to the next stage via a one bit delay 108. The *x* input channel is provided by track 110 which becomes the middle track of a circuit 112 similar to circuit 92. The middle track 110 also becomes the T output of the flip-flop stage. The *x* output track 114, which leads to the next flip-flop stage, is separated from the track 110 by a weak transfer field 116 operated by the adjacent flip-flop output track 106. Thus, when the flip-flop is set and contains a recirculating bubble, the *x* input bubble will be transferred from track 110 to the *x* output terminal. Otherwise, the *x* input bubble remains on track 110 to the T output channel. The *b* bubble arrives with the first bit of the address on the *x* input and sets the flip-flop 74 so that subsequent bubbles received on the *x* input are repelled to track 114 to subsequent flip-flop stages. The first bit of the address represented by the presence or absence of a bubble thus passes to the output T. The *e* bubble arrives after the last address bit is applied to the *x* input and resets the flip-flop 74. The one bit delay of *b* bubble causes it to arrive with the first remaining bit in the address on the *x* line as it arrives at each stage.

Figure 13:
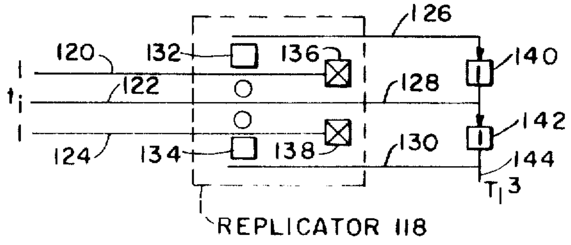
FIG. 13 is a schematic drawing illustrating a bubble logic circuit realization or one of the bubble triplers of FIG. 9.

An example of one bubble tripler 36 is shown in FIG. 13. The function of this circuit is to convert a single output $t_i$ into three serial identical output bits on one track represented as $T_i^3$. Accordingly, if $t_i$ is "0", $t_i^3$ will be 3 blank serial bits; and if $t_i$ is a "1" the output of the tripler will be three bubbles in a row. The circuit of FIG. 13 includes a replicator 118 with three input tracks 120, 122, and 124 with three output tracks 126, 128 and 130. The middle input track 122 receives the input variable $t_i$, and the other input tracks 120 and 124 have bubble generators symbolized by the numeral "1". The input $t_i$ is replicated on each output track 126, 128 and 130. The input tracks 120 and 124 are separated from the output tracks 126 and 130 respectively by weak transfer fields 132 and 134, both of which are operable in common by the $t_i$ input track 122, which passes through the replicator to become output track 128. Downstream of the field 132 and 134 the input tracks 120 and 124 are terminated by annihilators 136 and 138. Thus, the presence of a $t_i$ bubble causes a pair of additional bubbles to be transferred to the output tracks 126 and 130. The output tracks 126, 128 and 130 are interconnected by means of one bit delays 140 and 142 on a single output track 144 which converts the three parallel outputs 126, 128 and 130 to serial form.

Figure 14:
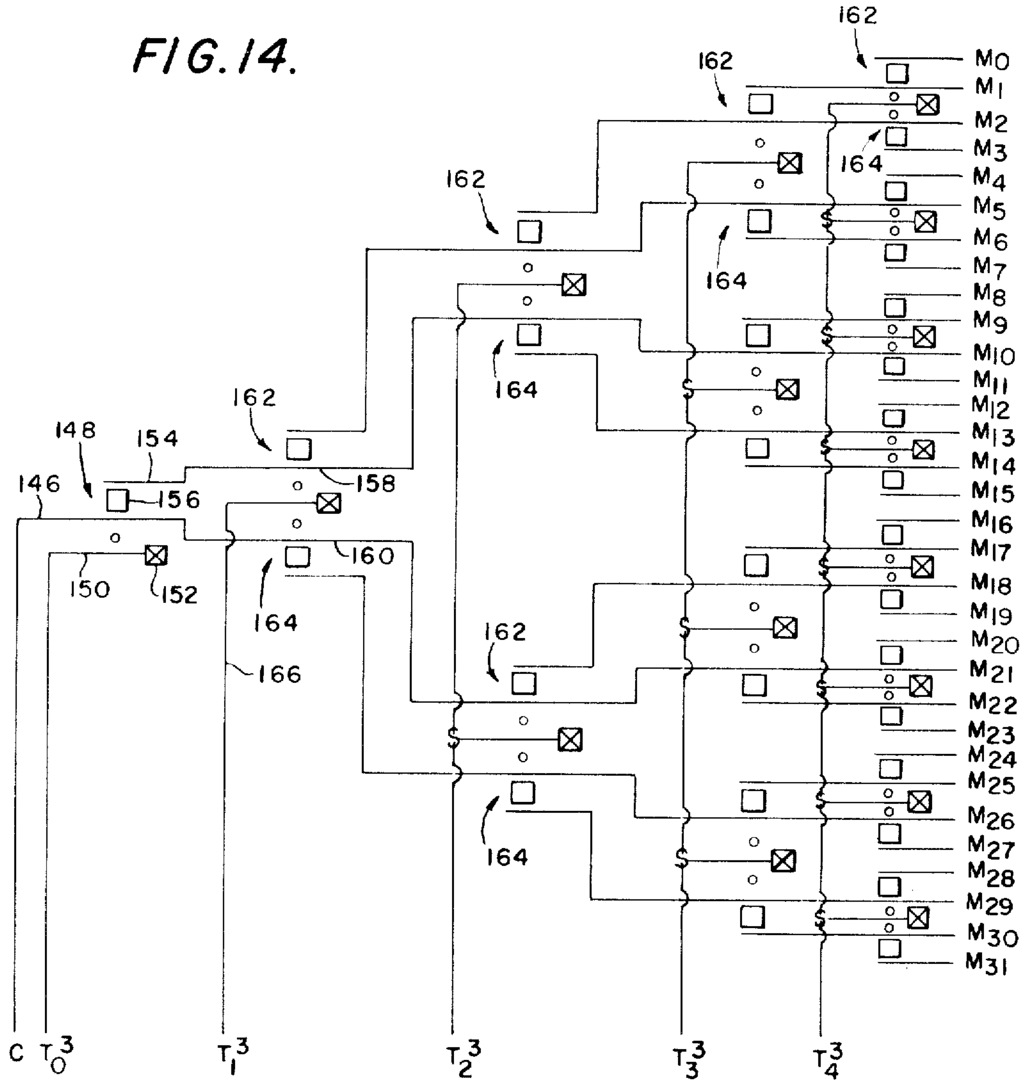
FIG. 14 is a schematic drawing illustrating a bubble logic circuit realization for the decoder of FIG. 9.

FIG. 14 illustrates a bubble realization for the 32 output decoder 38. One of these decoders is in each of the steering units 32 and 40 of FIG. 9.

This decoder is based on a tree of 3—3 bubble logic circuits referred to as belonging to class 21 in the Wescon paper. The "c" input is the three bit control field from the sorter 28 and the five $T_0^3$ inputs are from the bubble tripplers 36 (FIG. 9). The *c* input is applied to track 146 which forms the middle track of a 3—3 class 21 circuit 148. The address bit $T_0^3$ is applied to the bottom track 150 of the circuit 148. Track 150 has an annihilator 152 downstream of the circuit 148. The top track 154 of the circuit 148 is separated from the middle track 146 by a weak transfer field 156. A bubble on the track 150 will force a bubble on the track 146 to the top track 154 through the field 156. The top and middle tracks 146 and 154 form respectively the middle tracks 158 and 160 in a pair of mutually inverted circuits 162 and 164, each identical to circuit 148 except that a common "transfer control" track 166 corresponding to track 150 of circuit 148, is shared by circuits 162 and 164. The address bit $T_1^3$ is applied to track 166. The circuits 162 and 164 at the $T_1^3$ "level" have four output tracks to four circuits, two pairs of circuits 162 and 164, at the $T_2^3$ level, which in turn has eight output tracks to the $T_4^3$ level where 32 output tracks are provided by 16 circuits, eight pairs of circuits 162 and 164.

The use of tripled bubble addresses causes the decoder to be held at the same output for three bit times so that the sequential three bit control field ("c" of FIG. 14) is applied to the same addressed module. The decoder's output lines are connected separately to the *x* or control inputs of modules 0–31. For example, the logic expression defining the output to module 0 ($m_0$) as shown in FIG. 14, for the first control bit designated $C_x$ for this illustration, would be $C_xT_0T_1T_2T_3T_4$ where all of the variables $T_i$ are "true" and C is really the only variable. In other words, if the address is "11111", the output on line $M_0$ will be replica of the control field applied to input 146 and the outputs on lines $M_1$–$M_{31}$ will be 0 regardless of the control field. Likewise, if the address is "1110", that is the $T_4$ input is the absence of a bubble or $T'_4$, the control field applied to input 146 will be directed to line $M_1$. In a similar manner the rest of the lines $M_2$–$M_{31}$ represent the product permutations of the variables $T_i$.

Using current chevron circuit design techniques, the average area occupied by one gate is between 50 and 150 circuit periods, where one period corresponds to the length of one chevron element. Conservatively, assuming 50 gates per module with 100 periods per gate, approximately 100,000 periods are needed for all of the modules. An additional 20,000 periods for the control circuits would be generous. As a result, 180,000 periods would suffice for the central processing unit exclusive of the computer's memory. At present day capabilities of bubble chip sizes and circuits this would require two to four chips. The area taken by one 255 mark-time line is approximately 23,000 periods; therefore, one to four storage lines can be constructed on one chip using the available technology. Accordingly, the computer illustrated in FIG. 1 can fit on between 6 and 20 chips.

The time for a complete fetch-execute cycle is based on an average delay of 32 periods presented by each module plus an additional 32 periods needed for the control unit 10. If reasonably good programming practice is used, either the program or the data will be stored in lines fairly near modules 0 and 4, for example, modules 30 and 31. Assuming, however, that the instructions are stored four modules away and the data, 16 modules away, it follows that a fetch-execute cycle takes slightly less than 900 periods. At a $10^6$ bit per second rate, this corresponds to 1,000 instructions executed per second.

In order to increase the speed of the computer, synchronous operation can be achieved in some portions by using "bubble compressors" on the bubble tracks. For example, this would appear to be beneficial for the D signal sent from a module to the fetch-execute control 26 (FIG. 10). In addition, "phase shifts" of bubble words passing between modules can be accommodated by noting in the computer the path length between source and destination modules or by insuring that all path lenghts are a multiple of the word length.

Although the structural details in the description are directed to a computer of specific dimensions, it will be evident to those skilled in this art that the underlying principles can be applied to other systems, and the structure can be scaled or altered to meet different design criteria. The speed of propagation in magnetic circuits is presently in the range of three to 300 meters per second, which is several orders of magnitude slower than the propagation speed for electrical signals in wire. Accordingly, one design criterion is that the memory size and overall operating speeds of the bubble computer be realistic.

Although, the details of the subsystems, such as the mark-time lines have been illustrated in connection with a general purpose computer, the various subsystems are not limited in application to the general purpose computer described herein. For example, the fetch-execute control 26 is a general purpose toggle type routing circuit which may be useful in other applications. Likewise, the mark-time lines are general purpose serial shift registers. In addition, the general register module illustrates a general technique for idling, erasing, writing and reading a data register, as well as indicating the completion of one of these operations. Similarly, the decoding circuit shown in FIG. 9 for routing sequential control bits to specified addresses is another general purpose system, as are the subsystems of the decoding unit. Moreover, the specific size of many of the subsystems described herein is determined by specific dimensions of the computer system. The subsystems can be scaled, of course, to meet other requirements. For example, the five stage serial-to-parallel converter can be extended or contracted to any number of stages in an obvious manner. Similarly the bubble tripler can be extended to bubble multipliers of any dimensions by treeing a number of replicators (FIG. 13) and providing one bit delays between their serially interconnected outputs.

The invention may be embodied in other specific forms without departing from its spirit or its central characteristics. The present embodiments are, therefore, to be considered in all respects as illustrative and not restrictive. The scope of the invention is indicated by the claims rather than by the foregoing description, and all changes which come within the meaning and range of the equivalence of the claims are therefore intended to be embraced therein.

We claim:

1. A bubble circuit system, comprising a plurality of bubble logic modules for performing a plurality of operations in response to control signals, a closed bubble path interconnecting said modules for transmitting bubbles from one module to another and a central control unit separately connected with each one of said modules for selective operation thereof by means of said control signals.

2. The bubble circuit system of claim 1, wherein each module has means responsive to at least one of said control signals for passing incoming bubbles from said closed path through said module and back onto said closed path without change to serve a conduit function for said bubbles.

3. The bubble circuit system of claim 2, wherein at least two of said modules have read/write storage means oeprable by said control unit, and said control unit has means for causing one of said modules to read stored bubble bits out onto said closed path, another of said modules to write said bubble bits when received into said storage means, and the rest of said modules to serve said conduit function.

4. A bubble circuit arrangement, comprising a plurality of closed loops for circulating bubbles, a first closed bubble path interconnecting said closed loops, means for advancing bubbles from one loop to another via said first path, a second closed bubble path, and means selectively interconnecting one of said loops on said first path with said second path for transferring bubbles between said first and second bubble paths.

5. A bubble computer, comprising a plurality of bubble logic modules for performing a plurality of specified operations in response to control bubble bits, a closed bubble path interconnecting all of said modules in series, a bubble control unit, a plurality of control bubble paths between said control unit and corresponding ones of said modules, one subset of modules in which each module has at least one bubble register and means for writing incoming bubble bits into said register from said closed path and for reading out stored bubble bits onto said closed path, a second subset of modules in which each module has means for performing arithmetic operations on incoming data from said closed path, said control unit having means for causing said control bubble bits designating specific operations to be sent via said control bubble paths to said modules.

6. The computer of claim 5, wherein said control unit is adapted to operate said computer on a fetch-execute cycle and includes means for designating during the fetch phase one of said modules in said one subset as a source module and causing said source module to read an instruction out onto said closed path to an instruction register in a destination module in accordance with a command stored in one of said modules containing the address of said instruction, and means for sending control bubble bits during the execute cycle in accordance with the instruction in said instruction register to specified source and destination modules.

7. The computer of claim 6, wherein each of said modules has means for signalling said control unit via a respective control bubble path that bubble bits destined for that module have been received and said closed path is clear.

8. A bubble computer, comprising a plurality of bubble logic modules for performing specified operations in response to control bubble bits, a closed unidirectional bubble path interconnecting said modules in series, a bubble memory section including a plurality of serial bubble shift registers, a subset of said modules called line modules interfacing corresponding ones of said serial shift registers with said closed path, the remaining bubble performing a plurality of functions including arithmetical operations on incoming bubble bits on said closed path, a bubble control unit, a plurality of control bubble paths separately interconnecting all of said modules with said control unit, said control unit having means for sending control bubble bits to specified source and destination modules via said control bubble paths in accordance with an instruction from one of said modules.

9. The computer of claim 8, wherein each said line module has means for performing a search for bubble bits stored at an address specified by an instruction in one of said modules in accordance with specific control bubble bits from said control unit.

10. The computer of claim 9, wherein said control unit operates said computer on a fetch-execute cycle, in which during the fetch phase of one of said line modules is designated as a source module from which an instruction is fetched and sent via said closed path to an instruction register in a destination module, and during the execute phase the instruction stored in said instruction register is used by said control unit to designate the operations of specified source and destination modules, all of said modules having means for signalling said control unit via respective ones of said control paths when bubble bits destined for that module have been received, said control unit changing from the fetch to the execute phase or vice versa in response to a signal from a destination module.

11. The computer of claim 10, wherein said line module has means for carrying out a designated search after signalling said control unit to switch back to the fetch phase.

12. The computer of claim 8, wherein each said serial shift register includes a plurality of closed loops for circulating bubbles, a plurality of normally deactivated interloop transfer paths between said loops for causing serial transfer of the bubbles in one loop to a succeeding loop in response to a shift signal, each said line module having means for generating said shift signal on command.

13. A bubble serial shift register, comprising a bubble shift circuit including a plurality of closed loops for circulating bubbles and a plurality of normally deactivated interloop transfer paths between successive ones of said loops for causing serial transfer of the bubbles in one loop to the next loop in response to a shift signal, and means operatively connected to said shift circuit for generating said shift signal on command.

14. The shift register of claim 13, wherein the length of each interloop transfer path is sufficient to provide enough time for bubbles in said next loop to be extracted.

15. The shift register of claim 14, wherein each loop stores double data in the form of a word of specified length, the length of said transfer path corresponding to the word length.

16. The shift register of claim 13, wherein said shift signal generating means includes electrical conductor means arranged to magnetically influence bubble data in said loops to enter said transfer paths simultaneously.

17. The shift register of claim 16, wherein said closed loops and transfer paths are constructed of substantially similar circuit elements, each said transfer path having an entrance and an exit, said entrance to one of said transfer paths from one of said loops being formed by a branch off of said closed loop having means for excluding from said path bubbles circulating on said loop in the absence of said shift signal.

18. The shift register of claim 17, wherein said electrical conductor means includes a continuous conductor having a plurality of loops adjacent to corresponding entrances to said transfer paths for magnetically attracting bubbles in said closed loops onto said transfer paths simultaneously.

19. The shift register of claim 18, wherein at least one subset of said closed loops is arranged physically in series, with said transfer paths reversing direction once between adjacent closed loops such that the entrance and exit of each of said transfer paths is formed on corresponding adjacent sides of successive closed loops.

20. A bubble switching system, comprising flip-flop means for producing and ceasing to produce output bubbles in response to an input control bubble, and logic means responsive to said flip-flop means output having two input channels and an output channel for propagating bubbles corresponding to bubbles on one or the other of said input channels depending on the presence or absence of said flip-flop means output bubbles.

21. A bubble logic system for routing M sequential control bits to an address designated by N sequential address bits where M and N are integers, comprising serial-to-parallel control means having an input channel for receiving a bubble stream representing said N serial bits and having N output channels on said said address bits are produced in parallel, bubble multiplier means operatively receiving the outputs of said converter means and having N output channels on each of which the corresponding bubble bit is reproduced in series M times, and decoding means having $2^N$ parallel output and N parallel input channels for operatively receiving the outputs of said multiplier means and receiving said M sequential control bits for producing a serial output corresponding to said control bits on one of said $2^N$ output channels corresponding to the address represented by said N address bits.

22. A bubble multiplying circuit, comprising means for producing a plurality of simultaneous bubble bit replicas corresponding to a single bubble bit input, and parallel-to-serial converter means for producing said bubble bit replicas in series on an output channel.

* * * * *

UNITED STATES PATENT OFFICE
CERTIFICATE OF CORRECTION

Patent No. 3,798,607 Dated March 19, 1974

Inventor(s) Robert C. Minnick et al.

It is certified that error appears in the above-identified patent and that said Letters Patent are hereby corrected as shown below:

On the first page of the printed specification, in the list of inventors, "Robert T. Sandfort" should read -- Robert M. Sandfort --.

Signed and sealed this 3rd day of September 1974.

(SEAL)
Attest:

McCOY M. GIBSON, JR.
Attesting Officer

C. MARSHALL DANN
Commissioner of Patents